United States Patent [19]
Dunham

[11] Patent Number: 5,397,658
[45] Date of Patent: Mar. 14, 1995

[54] EDGE COATED ANODE CURRENT COLLECTOR CELLS AND METHODS

[75] Inventor: Thomas L. Dunham, Dodgeville, Wis.

[73] Assignee: Rayovac Corporation, Madison, Wis.

[21] Appl. No.: 106,540

[22] Filed: Aug. 16, 1993

[51] Int. Cl.⁶ .............................................. H01M 2/14
[52] U.S. Cl. .................................... 429/129; 429/142; 429/144; 429/245; 429/248; 428/647; 428/658; 428/677
[58] Field of Search ............... 429/129, 142, 144, 245, 429/248; 428/647, 658, 677

[56] References Cited

U.S. PATENT DOCUMENTS

| | | |
|---|---|---|
| 3,939,010 | 2/1976 | Coleman et al. |
| 3,945,847 | 3/1976 | Kordesch et al. |
| 3,954,505 | 5/1976 | Anderson ........................ 429/219 X |
| 3,978,803 | 9/1976 | Asano et al. .................... 428/647 X |
| 3,982,314 | 9/1976 | Ariga et al. ..................... 428/677 X |
| 4,125,638 | 11/1978 | Watanabe et al. ................ 429/199 |
| 4,585,715 | 4/1986 | Marple ............................ 429/194 |
| 4,925,754 | 5/1990 | Dunham .......................... 429/245 |
| 5,112,705 | 5/1992 | Hunter ............................ 429/206 |

*Primary Examiner*—Prince Willis, Jr.
*Assistant Examiner*—M. Nuzzolillo
*Attorney, Agent, or Firm*—Thomas D. Wilhelm; Thomas F. Woods

[57] ABSTRACT

A pre-form of an anode current collector for an alkaline electrochemical cell is plated at its edges with tin, zinc, or a combination of tin and zinc, to protect the anode current collector from chemically reacting with the anode paste, and forming hydrogen gas in the cell. The anode current collector, thus protected, is placed in an alkaline electrochemical cell with an anode paste preferably containing no mercury, without incurring deleterious swelling of the resulting cell.

45 Claims, 3 Drawing Sheets

EDGE COATED ANODE CURRENT COLLECTOR CELLS AND METHODS

FIELD OF THE INVENTION

This invention relates to electrochemical cells, and components of such cells. The invention relates specifically to an improved anode current collector, coated on its edges to protect the edge surfaces of a base layer of the substrate metal from attack, and subsequent release of hydrogen gas in an alkaline electrochemical cell environment.

BACKGROUND OF THE INVENTION

Metal oxide primary cells are generally constructed from a pressed metal oxide (e.g. manganese oxide, $MnO_2$) cathode, an anode paste prepared from zinc powder and a gel, and an alkaline electrolyte usually disposed within a separator between the anode and the cathode. All of these components are contained within an appropriate casing or housing.

Usually, the current from the cathode is collected from the core by a metallic member such as a portion of the cell steel casing or a metal cathode holder (e.g. a cup or clip) which holds the pressed cathode mass. Constructions of some cells of this type are disclosed in U.S. Pat. Nos. 3,939,010, 3,945,847, 4,125,638, 4,585,715, and 4,925,754. Most notably, my patent U.S. Pat. No. 4,925,754, herein incorporated by reference, teaches an electrochemical cell quite similar to the basic construction of the cells of this invention; the primary difference being in the construction of the anode current collector, and in the absence of mercury in the anode paste.

In electrochemical cells as above, the current collectors are typically made by cutting the collectors out of sheet metal substrate, and otherwise bending and/or forming the so cut pieces to make current collectors having the desired shape. The so-fabricated current collector is then assembled with the rest of the elements of the electrochemical cell, and the cell is sealed closed.

In such cells, it is known that there is potential for generation of hydrogen gas due to the spontaneous oxidation/reduction reaction of iron, generally according to the formula

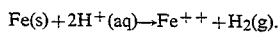

$Fe(s) + 2H^+(aq) \rightarrow Fe^{++} + H_2(g)$.

In the process of generating hydrogen gas in the cell, materials useful in the electrochemical function of the cell are consumed, thus reducing the useful life of the cell. In addition, hydrogen generation produces a gaseous pressure in the cell, causing the cell to expand, and creating the corresponding potential for bursting of the cell if the gaseous pressure overcomes the physical integrity of the cell structure.

In prior art, mercury was added as an ingredient in the anode paste, to suppress generation of hydrogen gas. Then, in response to recognition of the toxicity of mercury, a search was begun for alternative means for suppressing generation of hydrogen gas.

U.S. Pat. No. 3,785,868 Devitt suggests current collector substrates made from copper coated with tin, lead, or mercury, and made from tinplated steel.

U.S. Pat. No. 4,857,424 Larsen teaches that using organosilicates as additives in the anode paste allows for reduction in the amount of mercury used, but not for elimination of mercury, entirely.

U.S. Pat. No. 5,112,705 Hunter teaches using a copper-zinc anode current collector substrate, coated with a lead-containing layer.

It is an object of this invention to provide an anode current collector which does not contribute substantially to generation of hydrogen gas in the alkaline cell environment, and wherein the anode paste can be free from effective amounts of mercury.

It is a further object to provide an anode current collector wherein the edges of the current collector are post plated, after the cutting out of the current collector pre-form, with a metallic coating selected from the group consisting of zinc, tin, and a combination of 20–25% by weight zinc and 80–75% by weight tin.

It is another object to provide a coating of 1–100 microinches on the corresponding edge or edges of the base layer of steel.

It is yet another object to provide an alkaline electrochemical cell wherein generation of hydrogen gas is essentially eliminated.

It is still another object to provide a method of making an anode current collector by post-plating the edges of the current collector to thereby protect/coat exposed edges of a base layer of steel.

It is finally an object to provide a method of making an alkaline electrochemical cell wherein generation of hydrogen gas is essentially eliminated.

SUMMARY OF THE DISCLOSURE

Some of the objects are attained in an anode current collector, comprising an electrically conductive metallic substrate having opposing major sides and surfaces on the major sides, and edges, the substrate having a first metallic coating on the surfaces of the major sides, the first metallic coating providing sufficient hydrogen overvoltage that generation of hydrogen gas at the surfaces of the major sides is effectively suppressed when the anode current collector is used in an alkaline electrochemical cell environment; and a second metallic coating on the edges, the second metallic coating comprising material selected from the group consisting of zinc, tin, and a composition comprising 20–25% by weight zinc and 90–75% by weight tin.

The metallic substrate preferably comprises a base layer of steel, coated on the surfaces of its major sides with brass.

In some embodiments, the second metallic coating extends over the surface on at least one of the major sides.

The second metallic coating preferably is 1–100 microinches, more preferably about 50 to about 100 microinches, thick.

In some embodiments, the invention comprehends an electrochemical cell, comprising a cathode; an electrolyte free from effective amounts of mercury; and an anode, including an anode current collector as specified above.

The invention also comprehends a method of making an anode current collector, comprising selecting a substrate material comprising an electrically conductive metallic base layer having opposing major sides and surfaces on the major sides, the base layer having a first metallic coating on the surfaces of the major sides, the first metallic coating providing sufficient hydrogen overvoltage that generation of hydrogen gas at the surfaces of the major sides is effectively suppressed when the anode current collector is used in an alkaline electrochemical cell environment; cutting out a current collector pre-form from the substrate material, and thereby creating one or more exposed edges of the metallic base layer on the current collector preform; and after cutting out the current collector pre-form, applying a second metallic coating material to the exposed edges of the base layer, in the pre-form, and thereby coating the exposed edges of the base layer with the second metallic coating material, the second metallic coating material being selected from the group consisting of zinc, tin, and a composition comprising 20–25% by weight zinc and 80–75% by weight tin.

In the step of coating the edges of the base layer, the method can include stacking the current collector preforms such that surfaces of the major sides of adjacent ones of the preforms are in effective face-to-face contact with each other, whereby the surfaces of the major sides which are in such effective face-to-face contact are substantially free from added amount of the second metallic coating material.

The method preferably includes selecting, as the substrate, a steel base layer, coated on the surfaces of the major sides with brass.

The method also preferably includes applying the second metallic coating material on the substrate in a thickness of 1–100 microinches, preferably about 50 to about 100 microinches.

The invention further comprehends a method of making an electrochemical cell, comprising making an anode current collector as described above; assembling the anode current collector with an anode terminal, to make an electrochemical cell anode assembly; and assembling the anode with electrolyte and a cathode, to make the electrochemical cell.

Preferably, the method includes assembling the anode current collector to the anode terminal by welding; and selecting, as the electrolyte, an electrolyte free from effective amounts of mercury.

DETAILED DESCRIPTION OF THE ILLUSTRATED EMBODIMENTS

Figure 1:
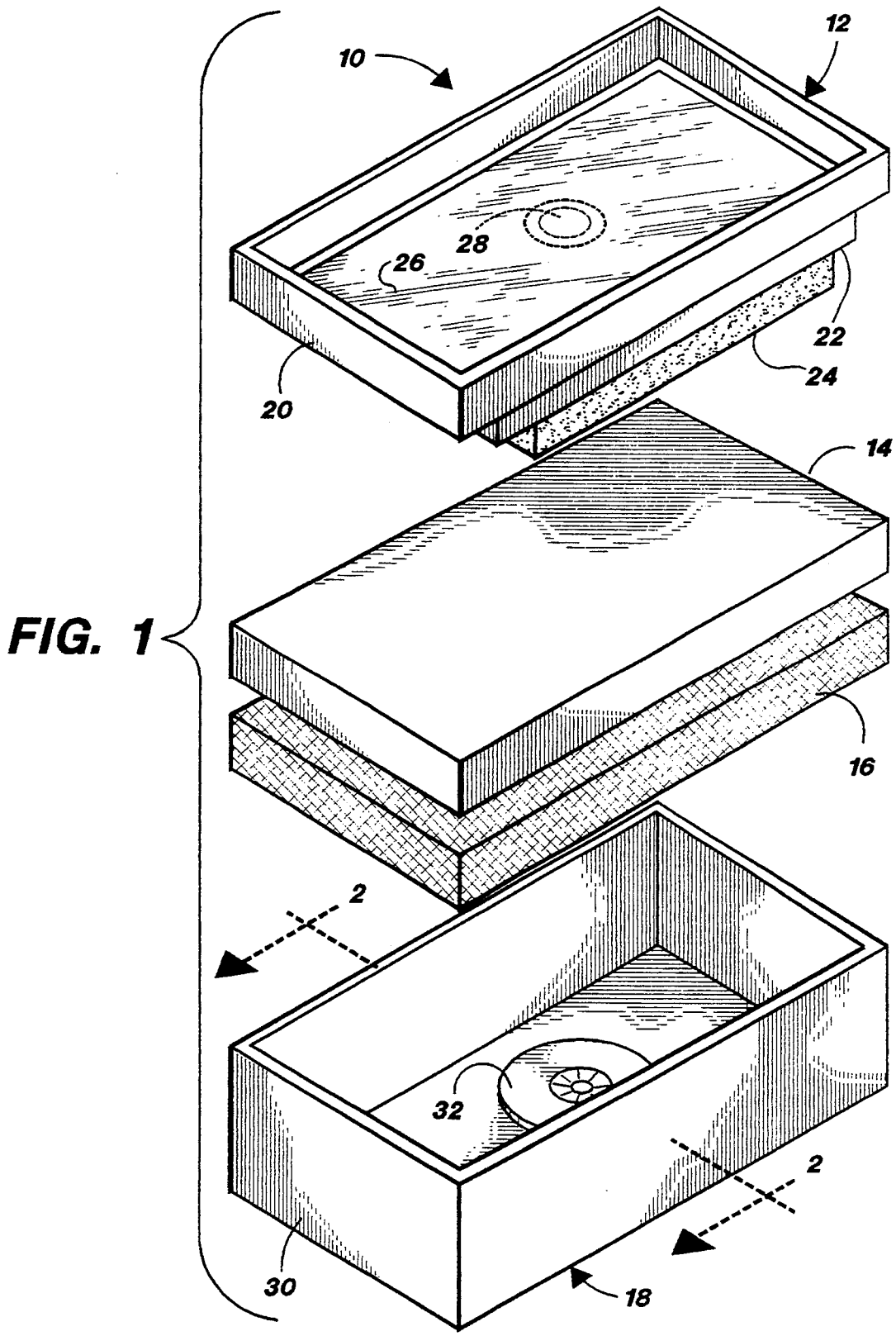
FIG. 1 is an exploded view of an electrochemical cell of the invention, showing a typical use of the anode current collector.

Referring, now to the drawings, FIG. 1 depicts a typical electrochemical cell 10 of the invention. The cell comprises a cathode assembly 12, a separator 14, anode material 16, and an anode assembly 18.

The cathode assembly 12 comprises a cathode case 20, typically made of polyvinyl chloride or the like, a cathode current collector 22, the pressed cathode element 24 received in the cathode current collector 22, and the cathode terminal 26. The cathode current collector 22 is joined to the cathode terminal by a spot weld at 28.

The anode assembly (see FIG. 2) comprises an anode case 30 of polyvinyl chloride or the like, an anode current collector 32, and an anode terminal 34. The anode current collector 32 is joined to the anode terminal by a spot weld 36 through the anode case 30. O-ring 38 provides a seal between anode current collector 32 and the anode case 30 about spot weld 36.

When the cell is assembled, anode material 16, typically a zinc-based paste, is placed within the anode case 30 such that contact is made with anode current collector 32. Then the anode assembly and cathode assembly are brought together, with the separator 14 between the anode material 16 and the cathode element 24. Prior to assembly of the cell, separator 14 is impregnated with an electrolyte such as potassium hydroxide.

The cathode current collector 22 and the cathode terminal 26 are preferably nickel-plated steel. The steel is compatible with the formation of spot weld 28, and strengthens the structural integrity of the cathode assembly, thus enhancing the ability of the various elements in the cathode assembly 12 to function together as a unit.

The cathode element 24 is typically a pressed pellet comprising 88% $MnO_2$, 10% graphite, and 2% polyethylene powder.

The anode terminal is preferably brass-plated steel. The steel is compatible with the formation of spot weld 36, and strengthens the structural integrity of the anode assembly, thus enhancing the ability of the various elements in the anode assembly 18 to function together as a unit.

The structure and configuration of anode current collector 32 are best seen in FIGS. 2-5. The fabrication of the anode current collector 32 is begun by stamping, die-cutting, or otherwise fabricating and forming a typically disc-shaped preform 32P from a strip of suitable metal sheet. The preferred metal sheet comprises a base layer of steel, coated on both sides with brass.

The anode current collector 32 comprises a substrate 40, having an electrically conductive base layer 42 of steel, coated on both of its major surfaces with layers 44 of brass. The layers 44 of brass protect the steel layer 42 both from oxidation during processing and from attack by the chemicals in an alkaline electrochemical cell. In the alkaline electrochemical cell, the brass provides sufficient hydrogen overvoltage that hydrogen gas is not generated at the brass surfaces.

Figure 2:
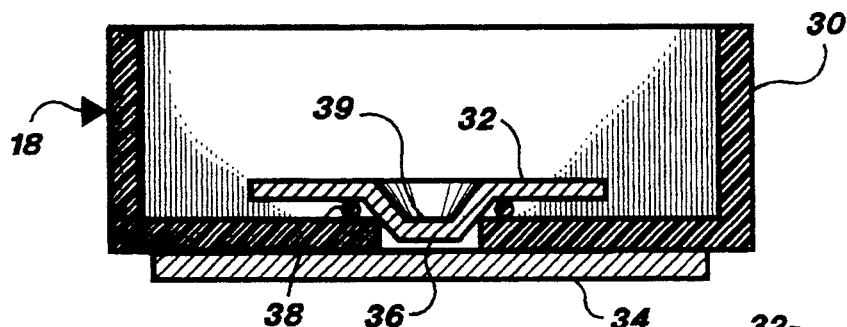
FIG. 2 is a cross-section of the anode assembly of the cell of FIG. 1, taken at 2—2 of FIG. 1.
Figure 3:
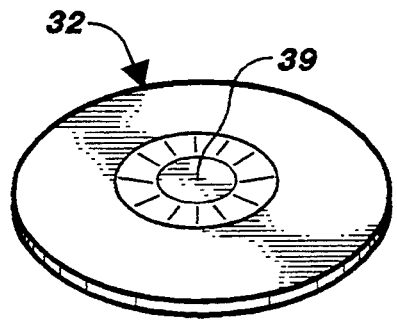
FIG. 3 shows a pictorial view of the anode current collector of the invention.
Figure 4:
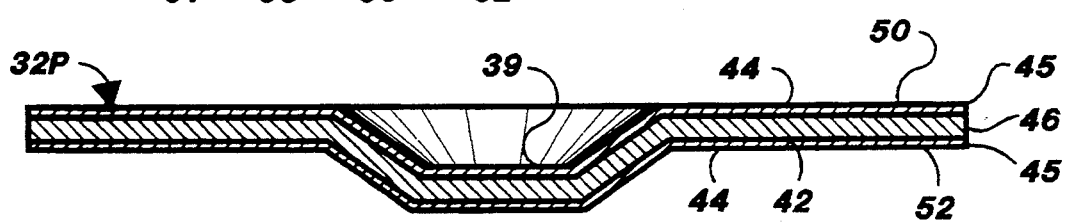
FIGS. 4 and 4A show enlarged cross-sections of the anode current collector, both before and after edge plating.

The anode current collector 32 is preferably fabricated by e.g. die-cutting and press-forming the disc-shaped pre-form 32P (FIG. 4) from a strip of brass-plated steel sheet; and simultaneously forming centrally located depression 39 to facilitate later welding at spot weld 36 (FIG. 2). The edges of the so fabricated disc-shaped preforms 32P include exposed edges 46 of the steel base layer as well as the edges 45 of the brass outer (coating) layers, as shown in FIG. 4.

Figure 4A:
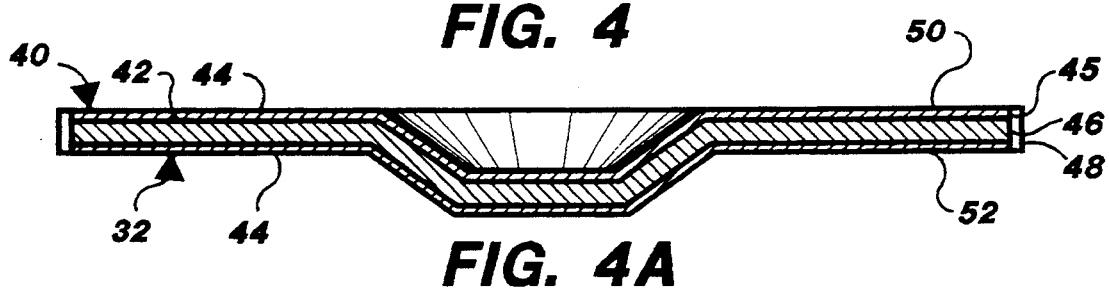

The steel at the exposed edges 46 of base layer 42 does not have a sufficiently high hydrogen overvoltage to suppress hydrogen gas generation, whereby the edges 46 are susceptible to hydrogen gas generation in an electrochemical cell if they are not protected. Thus, the exposed edges 45 and 46 of the brass-coated substrate, and especially the edges 46 of the steel layer 42, are post-coated with a layer 48 of a protective material having the necessary high hydrogen overvoltage, to make the finished anode current collector 32, as seen in FIG. 4A, with the coating layer 48 in surface-to-surface contact with the steel base layer 42 at edges 45. While the drawings (e.g. FIG. 4A) show both edges 45 and 46 as coated, a coating covering edges 46 and not edges 45 would work effectively, also.

Preferred protective materials are metal coatings, coated onto the edges 46 after the current collector preform 32P has been die cut or otherwise fabricated, and preferably as the last step in fabricating the anode current collector. The coating materials used in this invention are zinc, tin, and a combination of tin and zinc. These coating materials provide sufficient hydrogen overvoltage to protect the base layer 42 from reacting to thereby generate hydrogen gas. The coating material is preferably plated from a plating bath. The tin/zinc combination can be plated in a range of from about 25% zinc/75% tin to about 20% zinc/80% tin.

Any method may be used for applying the layer 48 onto the edges 46. Typical coating processes are electroplating, immersion plating, electroless plating, and hot dipping. Electro-deposition is usually preferred.

Figure 5:
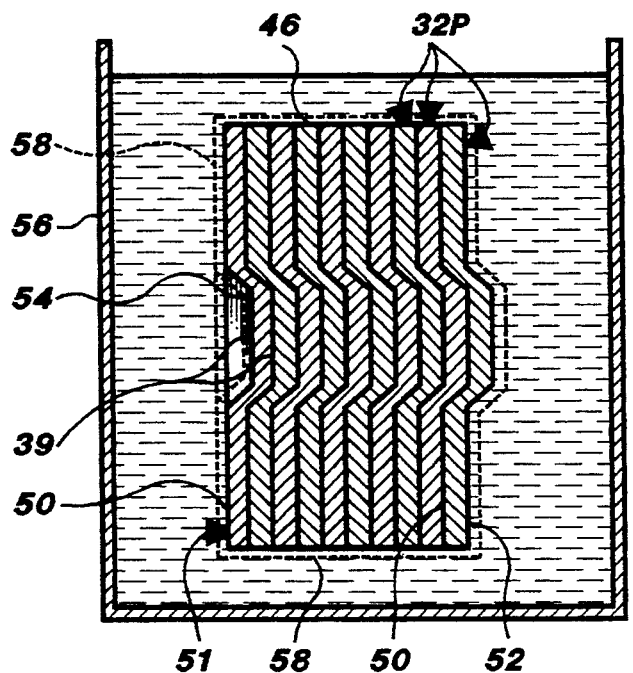
FIG. 5 shows a cross-section of a stack of anode current collectors in a plating bath.

FIG. 5 illustrates the method of coating the edges 46 of the steel base layer 42 in the anode current collector pre-forms 32P. Referring to FIG. 5, anode current collector pre-forms 32P are placed in a stack 51 in face-to-face relationship, with their major surfaces 50, 52, and depressions 39 in mating relationship. The stack 51 of pre-forms is immersed as shown in a plating bath 54 in a tank 56 or other suitable enclosure.

The outside surfaces of the stack 51 are plated, as shown by the dashed outline 58 around the stack. Thus, the end preforms in the stack 51 receive plating both on the edges 46, and on the respective major surfaces 50, 52. The pre-forms on the interior of the stack 51 receive plating primarily on the edges 46, and are substantially free from plating on the major surfaces 50, 52. It is critical to the invention that the edges 46 be plated as shown herein. Plating on major surfaces 50 and 52 is acceptable, but not necessary. Accordingly, the stack 51 should contain as many pre-forms as can be conveniently handled at one time, in order to economize on use of the plating material.

In the step of plating the pre-forms 32P, the plating material typically deposits on any/all surfaces on the outside of the stack. Thus, the edges of the brass layers 44 are plated, as well as the edges 46 of the base layer 42 of steel, all as shown in FIG. 4A.

If the cut edge 46 is not coated or otherwise protected, one takes the risk that the anode material will react with the steel at cut edge 46, generating hydrogen gas. The consequence of the reaction which generates the hydrogen gas is two-fold. First, the use life of the cell in producing electrochemical power is reduced by the amount of material used, such as anode material or electrolyte.

Second, the hydrogen gas exerts an internal pressure inside the sealed cell, causing expansion of the cell, and risk of bursting of the cell.

The thickness of coating 48 can range from as little as 1 microinch preferably 3 microinches (a "flash" coating), to as high as 100 microinches. While any amount of coating provides some benefit, at thicknesses up to about 50 microinches the degree of suppression of hydrogen gas formation is generally related to the thickness of the coating. While the coating is functionally effective at greater than 100 microinches, such thick coating is unnecessarily costly, and so 100 microinches is typically the maximum thickness of coating 48. A preferred coating thickness is about 50 to about 100 microinches.

Figure 6:
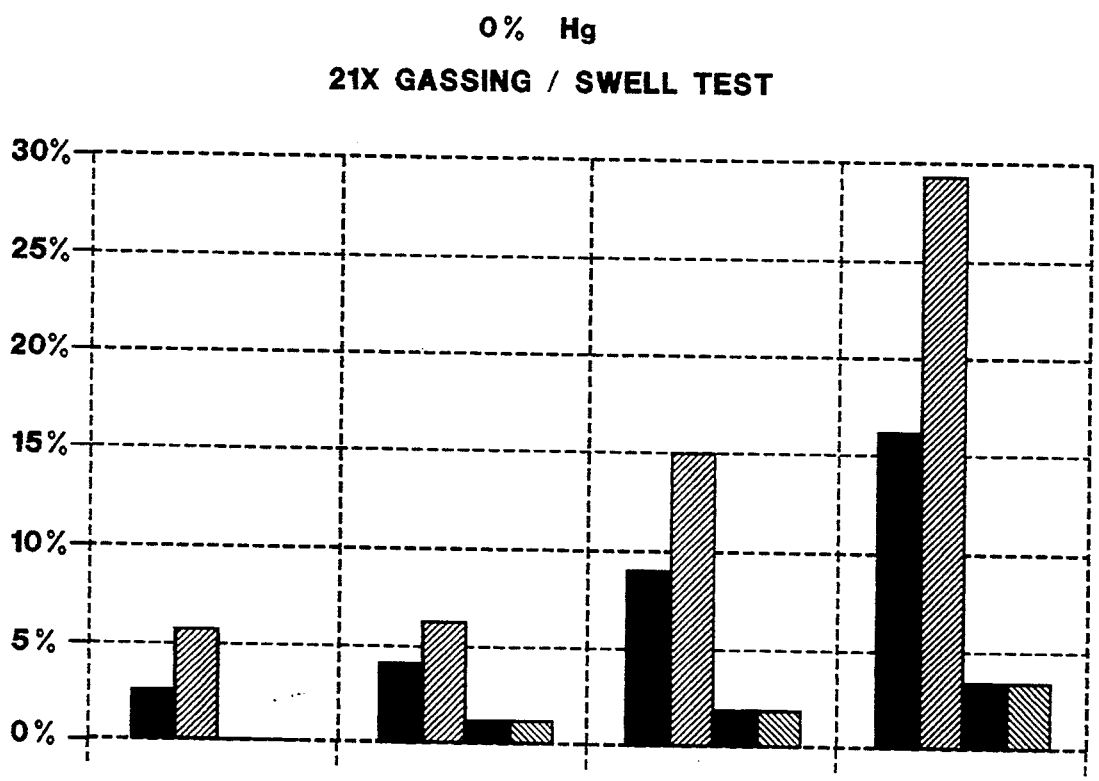
FIG. 6 shows, graphically and numerically, a comparison of swelling of representative electrochemical cells, with and without the post-plating of the invention.

By so coating the edges 46 of the steel base layer 42 in the anode current collector 32, generation of hydrogen gas is essentially eliminated, without use of mercury. FIG. 6 shows graphically the effect of plating the edges 46 with a protective layer 48. Referring, now, to FIG. 6, in trial "A," the cut edges of the anode current collector were not coated. A polyethylene glycol-based inhibitor was used in the anode paste to inhibit generation of hydrogen gas. In trial "B," the edges were again not coated, and this time no inhibitor was used. In trials "A" and "B," (which are not part of the invention disclosed herein) the "Total Volume" swelling was over 16% and 29% respectively.

Trials "C" and "D" were run using anode current collectors having edges coated with the preferred Sn/Zn material. After the cells were formed, their height, length, and width were measured and recorded. The cells were then subjected to accelerated aging by being exposed to twenty-one (21) sequential cycles of hot and cold temperatures. Each cycle had two steps. The cells were first raised to 130 degrees F. in an oven and held there for 16 hours, including the heating time. In the second step, the cells were chilled to zero degrees F. and held there for 8 hours including the chilling time.

After twenty-one such cycles, the height, length, and width were again measured and recorded. FIG. 6 reports the changes in height, length, and width after this accelerated aging test, as well as the change in Total Volume, which was computed from the combination of height, length, and width, as measured before and after the aging test.

As seen in FIG. 6, the swelling of the cells having the coating layers 48 (Trials "C" and "D") was less in each category measured, namely Height, Width, and Total Volume, than trials "A" and "B" whose anode current collectors were not post-coated on their edges. Total Volume swelling was only about 3% in Trials "C" and "D," compared to 16% and 29% respectively, for the prior art cells "A" and "B." Thus, the Total Volume swelling was reduced by $$\frac{16-3}{16} \times 100 = 81\%, \text{ and } \frac{29-3}{29} \times 100 = 90\%$$

respectively in Trials "C" and "D," evidence generation of hydrogen gas is essentially eliminated.

EXAMPLE 1

A cathode assembly was made as illustrated in FIG. 1, using a polyvinyl chloride cathode case. The cathode terminal and cathode collector were nickel-plated steel, spot welded together through the polyvinyl chloride cathode case. The cathode material was a pressed pellet comprising 88% $MnO_2$, 10% graphite, and 2% polyethylene powder as binder. The anode assembly was made as illustrated in FIG. 1, using a polyvinyl chloride anode case, a brass-plated steel anode terminal, and a brass-plated anode current collector having a layer 48 of about 50 microinches of 80% tin/20% zinc plating coated on the edges 46. The anode current collector was welded to the anode terminal as shown in FIG. 2. The anode paste was a mixture of about 55% zinc and 45% KOH, to which was added a gel made with Carbopol polyacrylic acid and carboxymethylcellulose, in sufficient quantity to provide good electrochemical contact between the paste and the anode current collector. The anode paste was free from any functional amount of mercury.

Cells as illustrated in FIG. 1 were assembled, aged for 2 weeks at 130 degrees F., and tested for swelling. The swelling was acceptable. Total Volume swelling averaged only about 3%.

The cells disclosed herein can be used alone, or can be stacked in series in order to make batteries having higher voltages, depending on the performance parameters desired for the end use.

EXAMPLE 2

Cells were made as in EXAMPLE 1, were assembled into 9-volt stacks, and were age tested as in EXAMPLE 1. Control cells were made the same except without the edge plating of the anode current collector. The comparative swell data were:

|  | Control | Example 2 |
|---|---|---|
| Swelling, Length | 1.9% | 0.5% |
| Swelling, Width | 3.7% | 1.2% |
| Swelling, Height | 0.9% | −0.1% |
| (Approximate) Total Swelling Volume Percent | 6.6% | 1.6% |
| (Approximate) Total Swelling Volume Reduction |  | 76% |

The several nickel-plated steel parts in the cells of this invention can be nickel plated by any means, including without limitation the Watts and sulfamate methods. Commercially available nickel-plated elements can be used. For example, cathode current collectors plated by Summit Corporation of America, Thomaston, Conn. (Watts and sulfamate plating); All-Rite Spring Company, Chicago, Ill. (Watts plating); Atlantic Precision Spring, Amphenol Division, Lisle, Ill. (sulfamate plating); and Norbert Plating, Chicago, Ill. (sulfamate plating); have been used and found to be suitable.

Those skilled in the art will now see that certain modifications can be made to the articles and methods herein disclosed with respect to the illustrated embodiments, without departing from the spirit of the instant invention. While the invention has been described above with respect to the preferred embodiments, it will be understood that the invention is adapted to numerous rearrangements, modifications, and alterations, and all such arrangements, modifications, and alterations are intended to be within the scope of the appended claims.

Having thus described the invention, what is claimed is:

1. An anode current collector, comprising:
   (a) an electrically conductive substrate having a base layer having opposing major sides and surfaces on said major sides, and edges, said base layer having a first metallic coating on said surfaces of said major sides; and
   (b) a second metallic coating on said edges, said second metallic coating comprising material selected from the group consisting of zinc, and a composition comprising 20–25% by weight zinc and 80–75% by weight tin.

2. An anode current collector, comprising:
   (a) an electrically conductive substrate having a base layer having opposing major sides and surfaces on said major sides, and edges, said base layer having a first metallic coating on said surfaces of said major sides, but not on said edges; and
   (b) a second metallic coating on said edges, and in surface-to-surface contact with said base layer at said edges, said second metallic coating comprising tin.

3. An anode current collector as in claim 1 or 2 wherein said base layer metallic substrate comprises steel, coated on said surfaces of said major sides with brass.

4. An anode current collector as in claim 1 or 2 wherein said second metallic coating extends over said surface on at least one of said major sides.

5. An anode current collector as in claim 3 wherein said second metallic coating extends over said surface on at least one of said major sides.

6. An anode current collector as in claim 1 or 2 wherein said second metallic coating is 1–100 microinches thick.

7. An anode current collector as in claim 3 wherein said second metallic coating is 1–100 microinches thick.

8. An anode current collector as in claim 4 wherein said second metallic coating is 1–100 microinches thick.

9. An electrochemical cell, comprising:
   (a) a cathode;
   (b) an electrolyte; and
   (c) an anode, including an anode current collector, said anode current collector comprising
      (i) an electrically conductive substrate having a base layer having opposing major sides and surfaces on said major sides, and edges, said base layer having a first metallic coating on said surfaces of said major sides; and
      (ii) a second metallic coating on said edges, said second metallic coating comprising material selected from the group consisting of zinc, tin, and a composition comprising 20–25% by weight zinc and 80–75% by weight tin.

10. An electrochemical cell as in claim 9 wherein said metallic substrate comprises steel, coated on said surfaces of said major sides with brass.

11. An electrochemical cell as in claim 9 or 10 wherein said second metallic coating extends over said surfaces on at least one of said major sides.

12. An electrochemical cell as in claim 9 or 10 wherein said second metallic coating is 1–100 microinches thick.

13. An electrochemical cell as in claim 11 wherein said second metallic coating is 1–100 microinches thick.

14. A method of making an anode current collector, comprising:
   (a) selecting an electrically conductive substrate material comprising a base layer having opposing major sides, and surfaces on said major sides, said base layer having a first metallic coating on said surfaces of said major sides;
   (b) cutting out a current collector pre-form from said substrate material, and thereby creating one or more exposed edges of said base layer on said current collector pre-form, said exposed edges not being coated by said first metallic coating; and
   (c) after cutting out said current collector pre-form, applying a second metallic coating material in surface-to-surface contact with said base layer at said exposed edges, and thereby coating said exposed edges of said base layer with said second metallic coating material, said second metallic coating material being selected from the group consisting of zinc, tin, and a composition comprising 20–25% by weight zinc and 80–75% by weight tin.

15. A method as in claim 14 and including, in said step of coating said edges of said base layer, the step of stacking said current collector pre-forms such that surfaces of said major sides of adjacent ones of said pre-forms are in such face-to-face contact with each other that such surfaces of said major sides are substantially free from added amount of said second metallic coating material at the completion of step (c).

16. A method as in claim 14 and including selecting, as said substrate, a steel base layer, coated on said surfaces of said major sides with brass.

17. A method as in claim 14 and including applying said second metallic coating material on said substrate in a thickness of 1–100 microinches.

18. A method as in claim 16 and including applying said second metallic coating material on said substrate in a thickness of 1–100 microinches.

19. A method of making an electrochemical cell, comprising:
 (a) making an anode current collector by (i) selecting an electrically conductive substrate material comprising a base layer having opposing major sides, and surfaces on said major sides, said base layer having a first metallic coating on said surfaces of said major sides; (ii) cutting out a current collector pre-form from said substrate material, and thereby creating one or more exposed edges of said base layer on said current collector pre-form, said exposed edges not being coated by said first metallic coating; and (iii) after cutting out said current collector pre-form, applying a second metallic coating material in surface-to-surface contact with said base layer at said exposed edges, and thereby coating said exposed edges of said base layer with said second metallic coating material, said second metallic coating material being selected from the group consisting of zinc, tin, and a composition comprising 20–25% by weight zinc and 80–75% by weight tin;
 (b) assembling said anode current collector with an anode terminal, to make an electrochemical cell anode; and
 (c) assembling said electrochemical cell anode with electrolyte and a cathode, to make said electrochemical cell.

20. A method as in claim 19 and including selecting as said substrate a steel base layer, coated on said surfaces of said major sides with brass.

21. A method as in claim 20 and including assembling said anode current collector to said anode terminal by welding.

22. A method as in claim 19 and including applying said second metallic coating material on said pre-form in a thickness of 1–100 microinches.

23. A method as in any one of claims 19–22 and including selecting, as said electrolyte, an electrolyte free from mercury.

24. An anode current collector consisting essentially of:
 (a) an electrically conductive substrate having a base layer having opposing major sides and surfaces on said major sides, and edges, said base layer having a first metallic coating on said surfaces of said major sides, but not on said edges; and
 (b) a second metallic coating on said edges, and in surface-to-surface contact with said base layer at said edges, said second metallic coating comprising tin.

25. An anode current collector as in claim 24 wherein said metallic substrate comprises steel, coated on said surfaces of said major sides with brass.

26. An anode current collector as in claim 24 wherein said second metallic coating is 1–100 microinches thick.

27. An anode current collector as in claim 25 wherein said second metallic coating is 1–100 microinches thick.

28. An electrochemical cell, consisting essentially of:
 (a) a cathode;
 (b) an electrolyte; and
 (c) an anode, including an anode current collector, said anode current collector comprising
  (i) an electrically conductive substrate having a base layer having opposing major sides and surfaces on said major sides, and edges, said base layer having a first metallic coating on said surfaces of said major sides; and
  (ii) a second metallic coating on said edges, said second metallic coating comprising material selected from the group consisting of zinc, tin, and a composition comprising 20–25% by weight zinc and 80–75% by weight tin.

29. An electrochemical cell as in claim 28 wherein said second metallic coating is 1–100 microinches thick.

30. An anode current collector consisting of:
 (a) an electrically conductive substrate having a base layer having opposing major sides and surfaces on said major sides, and edges, said base layer having a first metallic coating on said surfaces of said major sides, but not on said edges; and
 (b) a second metallic coating on said edges, and in surface-to-surface contact with said base layer at said edges, said second metallic coating comprising tin.

31. An anode current collector as in claim 30 wherein said metallic substrate comprises steel, coated on said surfaces of said major sides with brass.

32. An anode current collector as in claim 30 wherein said second metallic coating is 1–100 microinches thick.

33. An anode current collector as in claim 31 wherein said second metallic coating is 1–100 microinches thick.

34. An electrochemical cell, consisting of:
 (a) a cathode;
 (b) an electrolyte; and
 (c) an anode, including an anode current collector, said anode current collector comprising
  (i) an electrically conductive substrate having a base layer having opposing major sides and surfaces on said major sides, and edges, said base layer having a first metallic coating on said surfaces of said major sides; and
  (ii) a second metallic coating on said edges, said second metallic coating comprising material selected from the group consisting of zinc, tin, and a composition comprising 20–25% by weight zinc and 80–75% by weight tin.

35. An electrochemical cell as in claim 34 wherein said second metallic coating is 1–100 microinches thick.

36. An anode current collector consisting essentially of:
 (a) a substrate having an electrically conductive base layer having opposing major sides and surfaces on said major sides, and edges, said base layer having a first metallic coating on said surfaces of said major sides; and
 (b) a second metallic coating on said edges, said second metallic coating comprising material selected from the group consisting of zinc, and a composition comprising 20–25% by weight zinc and 80–75% by weight tin.

37. An anode current collector as in claim 36 wherein said substrate comprises steel, coated on said surfaces of said major sides with brass.

38. An anode current collector as in claim 36 wherein said second metallic coating is 1–100 microinches thick.

39. An anode current collector as in claim 37 wherein said second metallic coating is 1–100 microinches thick.

40. An anode current collector consisting of:
(a) a substrate having an electrically conductive base layer having opposing major sides and surfaces on said major sides, and edges, said base layer having a first metallic coating on said surfaces of said major sides; and
(b) a second metallic coating on said edges, said second metallic coating comprising material selected from the group consisting of zinc, and a composition comprising 20–25% by weight zinc and 80–75% by weight tin.

41. An anode current collector as in claim 40 wherein said base layer comprises steel, coated on said surfaces of said major sides with brass.

42. An anode current collector as in claim 40 wherein said second metallic coating is 1–100 microinches thick.

43. An anode current collector as in any one of claims 1, 2, 24, 30, 36, or 40, wherein said first metallic coating provides sufficient hydrogen overvoltage that generation of hydrogen gas at said surface of said major side, when said anode current collector is used in an alkaline electrochemical cell environment, is suppressed.

44. An electrochemical cell as in any one of claims 9, 28, or 34, wherein said first metallic coating provides sufficient hydrogen overvoltage that generation of hydrogen gas at said surface of said major sides is suppressed.

45. A method as in any one of claims 14 or 19 wherein said first metallic coating provides sufficient hydrogen overvoltage that generation of hydrogen gas at said surfaces of said major sides is suppressed in an alkaline electrochemical cell environment.

* * * * *